(12) United States Patent
Webster et al.

(10) Patent No.: US 9,807,447 B2
(45) Date of Patent: Oct. 31, 2017

(54) INTELLIGENT SCHEDULING OF DVR COMMANDS AND DVR CLIENT STATUS UPDATES

(71) Applicant: Verizon Patent and Licensing Inc., Arlington, VA (US)

(72) Inventors: Christopher Webster, Redwood City, CA (US); Christopher H. Habliston, San Jose, CA (US); Srividhya Narayanan, Palo Alto, CA (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 59 days.

(21) Appl. No.: 14/841,101

(22) Filed: Aug. 31, 2015

(65) Prior Publication Data

US 2017/0064378 A1    Mar. 2, 2017

(51) Int. Cl.

| H04N 7/173 | (2011.01) |
| H04N 21/433 | (2011.01) |
| H04N 5/775 | (2006.01) |
| H04N 21/41 | (2011.01) |
| H04N 21/4147 | (2011.01) |
| H04N 21/458 | (2011.01) |
| H04N 5/76 | (2006.01) |
| H04N 21/845 | (2011.01) |
| H04N 21/2668 | (2011.01) |
| H04N 21/258 | (2011.01) |

(52) U.S. Cl.
CPC ....... *H04N 21/4334* (2013.01); *H04N 5/7605* (2013.01); *H04N 5/775* (2013.01); *H04N 21/25891* (2013.01); *H04N 21/2668* (2013.01); *H04N 21/4135* (2013.01); *H04N 21/4147* (2013.01); *H04N 21/4583* (2013.01); *H04N 21/8456* (2013.01)

(58) Field of Classification Search
CPC ..................... H04N 21/262; H04N 21/4583
See application file for complete search history.

(56) References Cited

U.S. PATENT DOCUMENTS

| 2004/0078817 A1* | 4/2004 | Horowitz | H04N 5/782 725/58 |
| 2005/0216942 A1* | 9/2005 | Barton | H04N 7/17318 725/97 |
| 2006/0136966 A1* | 6/2006 | Folk, II | H04N 5/44543 725/58 |
| 2010/0061708 A1* | 3/2010 | Barton | H04N 5/765 386/241 |
| 2012/0072939 A1* | 3/2012 | Crenshaw | H04N 60/33 725/10 |

* cited by examiner

Primary Examiner — Olugbenga Idowu

(57) ABSTRACT

A computer device may include logic configured to detect a change in a digital video recorder (DVR) recording list associated with a customer and generate an updated DVR recording list based on the detected change. The logic may be further configured to generate a schedule for an update notification for a DVR device associated with the customer and send an update notification to the DVR device associated with the customer based on the generated schedule.

19 Claims, 9 Drawing Sheets

INTELLIGENT SCHEDULING OF DVR COMMANDS AND DVR CLIENT STATUS UPDATES

BACKGROUND INFORMATION

A customer may use a digital video recorder (DVR) device to record television broadcast content for later viewing. The DVR device may record a broadcast stream that is being sent by a provider of television services over a network connection to a set-top box in the customer's premises, such as the customer's home. The DVR device may need to communicate with devices managed by the provider of television services in order to record broadcast content selected by the customer. A large number of DVR devices may be connected to the provider's network and may tax the resources of the provider's network.

DETAILED DESCRIPTION OF PREFERRED EMBODIMENTS

Figure 1:
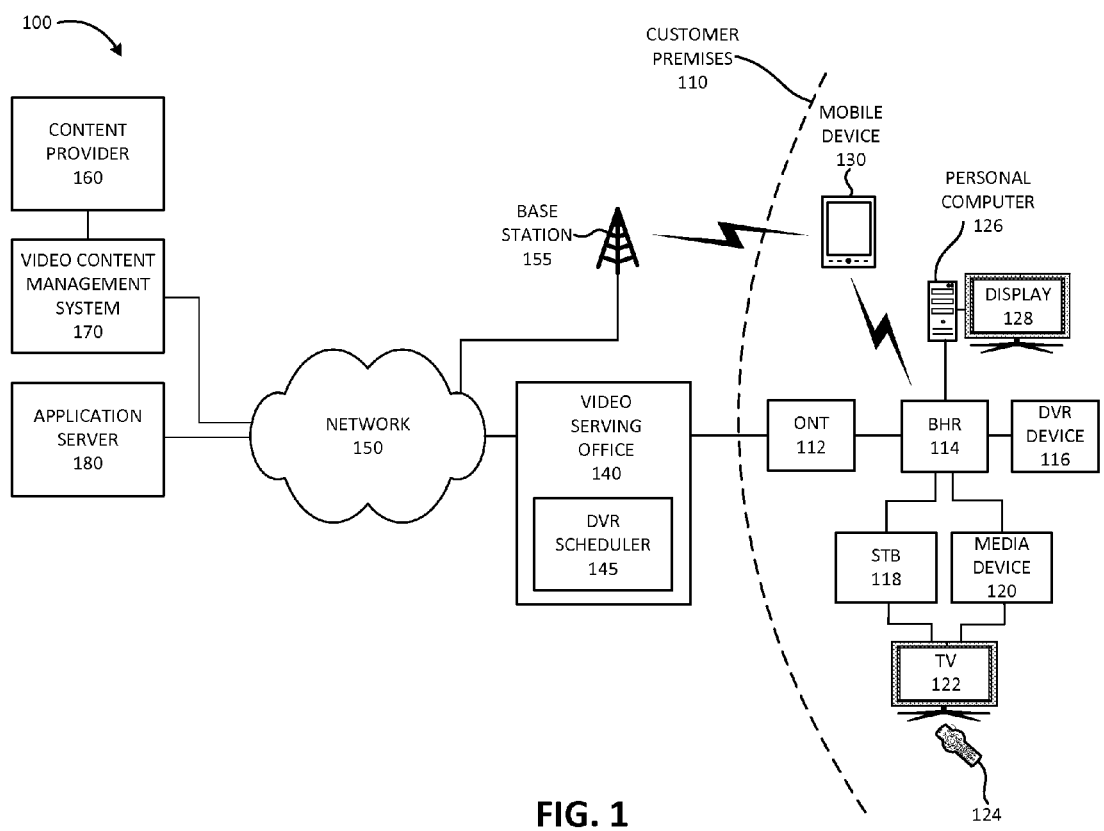
FIG. 1 is a diagram illustrating an environment according to one or more implementations described herein.

The following detailed description refers to the accompanying drawings. The same reference numbers in different drawings identify the same or similar elements.

A DVR device, also referred to as a DVR client, may be responsible for recording content streams and to physically store recorded content streams for later viewing. The DVR device may communicate with a DVR scheduler, also referred to as a DVR service, that is maintained by a provider and that manages scheduling of DVR recordings and coordinates the functioning of DVR devices associated with customers serviced by the provider. The customers may receive television broadcasts via a network maintained by the provider and may request to record particular broadcast content using a DVR device.

The DVR scheduler may maintain a DVR recording list for each DVR device. The DVR scheduler provides the DVR recording list to the DVR device and the DVR device records broadcast content included in the DVR recording list based on the schedule of the broadcast content.

The DVR scheduler may detect a change in the DVR recording list for a customer. For example, a customer may make a new request, such as a request to record particular content (e.g., a movie, a television show, sporting event broadcast, etc.), a new recording may be added to the list by the DVR scheduler based on the customer's preferences (e.g., a new episode for a TV show the customer is watching, etc.), a broadcast time for an item on the list may be rescheduled, or another type of change may be detected. The DVR scheduler may, in response to the detected change in the DVR recording list, send an update notification to the DVR device associated with the customer.

The update notification may include the updated DVR recording list or may instruct the DVR device to obtain the updated DVR recording list from the DVR scheduler. Once the DVR device retrieves or obtains the updated DVR recording list, the DVR device may synchronize the updated DVR recording list with a locally maintained list of DVR recordings. For example, the DVR device may remove any DVR recording requests from the locally maintained list that are not included in the updated DVR recording list and may add any DVR recording requests to the locally maintained list which were included in the updated DVR recording list and not in the locally maintained list. Furthermore, the DVR device may update any changes to the metadata included in the locally maintained DVR recording list based on the updated DVR recording list, such as a change to a broadcast time of a broadcast content included in the DVR recording list and thus a change to the scheduled start and/or end times for the DVR recording to be performed.

In a network with a large number of DVR devices, a large number of update notifications may result in a large amount of traffic across network connections between the DVR devices and the DVR scheduler. For example, each time a DVR device receives an updated DVR recording list, the DVR device may need to first establish a secure connection with the DVR scheduler, resulting in multiple handshake messages being exchanged, followed by the transmittal of the updated DVR recording list. Thus, for example, if a large number of recording requests are received or generated for particular broadcast content, or if a particular broadcast content with a large number of DVR recording requests is rescheduled, a large number of update notifications may be generated within a short period of time, resulting in a large number of responses from DVR devices, which may simulate a denial of service event that may tax or even exceed the capacity of the network. Furthermore, when a DVR device finishes a recording, the DVR device may send a status report to the DVR scheduler, indicating that the recording was successfully completed. For broadcast content associated with a large number of DVR recording requests, the large number of status reports from the DVR devices may likewise simulate a denial of service event that may tax or exceed the capacity of the network.

Implementations described herein relate to intelligent scheduling of DVR commands and DVR client status updates. A DVR scheduler may be configured to schedule outgoing messages to DVR devices, such as update notifications, commands to DVR devices, and/or other types of outgoing messages, in order to minimize the impact of the messages on the communication capacity of a connection from the DVR scheduler to the DVR devices. The DVR scheduler may be configured to detect a change in a DVR recording list associated with a customer and to generate an updated DVR recording list based on the detected change. The DVR scheduler may be further configured to generate a schedule for an update notification for a DVR device associated with the customer and send an update notification to the DVR device associated with the customer based on the generated schedule.

The schedule for the update notification may be based on a broadcast schedule for content associated with the updated DVR recording list. As an example, the DVR scheduler may determine that a broadcast content, included in the updated DVR recording list, has been delayed to a later broadcast time from a previously scheduled broadcast time and may delay the update notification to the DVR device based on determining that the broadcast content has been delayed. As another example, the DVR scheduler may detect a metadata change for the broadcast content and may schedule the update notification to the DVR device based on a scheduled broadcast time for the broadcast content. As yet another example, if the DVR recording lists of a large number of customers include a particular broadcast content (e.g., greater that a threshold), the DVR scheduler may distribute the update notifications for the customers over a time period. For example, the DVR scheduler may divide a time period before the upcoming scheduled broadcast time for the particular broadcast content into time segments and may assign different subsets of the customers to different time segments. Each subset of the customers may then receive the update notification within the assigned time segment.

The schedule for the update notification may be based on an estimated network load for a connection between the DVR scheduler and the DVR device during an upcoming time period. For example, the DVR scheduler may send update notifications during a time period of historically lower network traffic. Thus, the DVR scheduler may determine that a broadcast content on a customer's updated DVR recording list has a scheduled broadcast time that is later than a first time period with an estimated network load that is higher than the estimated network load during a second time period, which is after the first time period and before the scheduled broadcast time, and may schedule the update notification to the DVR device to be sent during the second time period. The first time period may correspond to a particular time of day with a higher broadcast content viewing rate than a broadcast content viewing rate associated with the second time period, a time period with a number of recording requests that is higher than a recording request threshold, a time period with a scheduled broadcast content with an estimated viewership number that higher than a viewership threshold, and/or another type of time period with a high estimated network load.

The schedule for the update notification may be based on a capacity of the DVR device. The capacity of the DVR device may be determined based on an available storage space on the DVR device, based on a number of concurrent recording streams that the DVR device may record at a particular time, and/or based on another parameter. For example, the DVR scheduler may determine that a broadcast content, included on the updated DVR recording list, has a scheduled broadcast time that is later than a first time period with a capacity that is lower than the capacity during a second time period, which is after the first time period and before the scheduled broadcast time, and may schedule the update notification to the DVR device to be sent during the second time period.

The schedule for the update notification may be based on a viewing history associated with the customer. For example, the DVR scheduler may determine that a broadcast content, included in the updated DVR recording list, has a first scheduled broadcast time and a second scheduled broadcast time that is later than the first scheduled broadcast time, determine, based on the viewing history of the customer, that the customer is estimated to watch the broadcast content after the second scheduled broadcast time, and may schedule the update notification to the DVR device to be sent during a time period between the first schedule broadcast time and the second scheduled broadcast time.

Furthermore, the DVR scheduler may be configured to schedule incoming messages from DVR devices, such as DVR device status updates and/or other types of incoming messages, in order to minimize the impact of the messages on the communication capacity of a connection from the DVR scheduler to the DVR devices. For example, the DVR scheduler may assume that a DVR recording was successfully performed by a DVR device unless an error report is generated by the DVR device. Thus, the DVR scheduler may instruct a DVR device to cease sending status reports indicating a successful recording and/or may instruct the DVR device to not send a status report for a broadcast content associated with the updated DVR recording list unless an error is detected during a recording of the broadcast content. Additionally or alternatively, the DVR scheduler may determine that a broadcast content is associated with a number of recording requests that is higher than a recording request threshold and may instruct a DVR device to delay sending any error messages detected during the recording of the broadcast content until a particular time period has elapsed. Moreover, the DVR scheduler may determine the customers that have requested to record the broadcast content, may generate an error reporting schedule for the customers with different subsets of the customers assigned to a different time segments of a time period, and may instruct DVR devices associated with a particular subset of the customers to report any errors associated with recording of the broadcast content during the assigned time segment for the particular subset.

The term "customer," as used herein, may refer to any person using a particular account associated with a set-top box or DVR device. Thus, the term "customer" may refer to multiple persons, such as multiple family members requesting to record content using a DVR device located in a customer premises location.

While implementations described herein relate to scheduling of DVR commands and DVR client status updates, other implementations may relate to other types of systems with sporadically connected synchronization processes in which a client device maintains a local copy of server-generated instruction until a next synchronization takes place. As an example, a centralized command and control system may generate periodic command and control instructions for satellites or goal-oriented autonomous vehicles that store local instructions. The satellites or autonomous vehicles may rely on the local instructions during a communication failure with the command and control system.

The command and control system may be configured to detect a change in an instructions list associated with a satellite or vehicle and to generate an updated instructions list based on the detected change. The command and control system may be further configured to generate a schedule for an update notification to the satellite or vehicle and to send an update notification to the satellite or vehicle based on the generated schedule. The schedule may be based on a time-table for when the instructions are to be carried out, based on an estimated load for any communication links to the satellites or vehicles, based on an estimated signal quality for the communication links, based on a capacity of the satellites or vehicles, based on an instruction execution history associated with particular satellites or vehicles, and/or based on other parameters.

As another example, a centralized music list manager may generate periodic updates to a music list for a media playing device based on a wish list associated with a user of the media playing device. As new content from the wish list is detected as being available, the centralized music list manager may generate an update notification for the media playing device. The centralized music list manager may be further configured to generate a schedule for the update notification to the media playing device and to send an update notification to the media playing device based on the generated schedule.

As yet another example, a home control system may be synchronized with the mobile communication devices of multiple users. A centralized service may monitor the calendars, locations, messages, and/or status updates via the mobile communication devices of the multiple users for any changes to determine when to send an update notification to the home control system. The update notification may be scheduled, for example, in connection with a user's arrival at the home (e.g., based on location and traffic conditions, etc.) to activate a particular device at the user's home via the home control system. For example, the update notification may cause an oven to start heating up in anticipation of a user's arrival home to cook dinner.

FIG. 1 is a diagram of an exemplary environment 100 in which systems and/or methods, described herein, may be implemented. As shown in FIG. 1, environment 100 may include a customer premises 110, a video serving office 140, a network 150, a content provider 160, a video content management system (VCMS) 170, and an application server 180.

Customer premises 110 may include a particular location (or multiple locations) associated with a customer. For example, customer premises 110 may include the customer's home, a customer's place of business, etc. Customer premises 110 may include an optical network terminal (ONT) 112, a broadband home router (BHR) 114, a DVR device 116, a set top box (STB) 118, a media device 120, a television 122, a remote control 124, a personal computer 126, a display 128, and a mobile device 130.

ONT 112 may receive content from video serving office 140 via a connection, such as, for example, a fiber-optic cable connection, a coaxial cable connection, a wireless connection, and/or another type of connection. Furthermore, ONT 112 may send information from video serving office 140 to BHR 114 and/or from BHR 114 to video serving office 140. In one implementation, ONT 112 may include an optical network terminal and ONT 112 and video serving office 140 may form part of a high-speed fiber optic network. In another implementation, ONT 112 may include a cable modem. In yet another implementation, ONT 112 may include a fixed wireless transceiver, a WiFi access point, and/or a Bluetooth device. Additionally or alternatively, ONT 112 may include a layer 2 and/or layer 3 network device, such as a switch, router, firewall, and/or gateway. Customer premises 110 may receive one or more services via the connection between ONT 112 and video serving office 140, such as, for example, a television service, Internet service, and/or voice communication (e.g., telephone) service.

BHR 114 may include a network device configured to function as a switch and/or router for the devices in customer premises 110. Furthermore, BHR 114 may function as a wireless access point (e.g., WiFi access point) for devices in customer premises 110. BHR 114 may support different types of interfaces, such as an Ethernet interface, a WiFi interface, and/or a Multimedia over Coaxial Alliance (MoCa) interface.

DVR device 116 may include one or more devices that record and/or playback broadcast content received from video serving office 140 and which a customer has requested to be recorded. DVR device 116 may receive instructions from video serving office 140 instructing DVR device 116 which broadcast content should be recorded. DVR device 116 may include one or more storage devices (e.g., a storage device with 1 terrabyte (TB) of memory or storage device with a different amount of memory, etc.) for digitally recording the requested broadcast content and may report any recording errors to video service office 140.

STB 118 may receive content and output the content to television 122 for display. STB 118 may include a component (e.g., a cable card or a software application) that interfaces with (e.g., plugs into) a host device (e.g., a personal computer, television 122, a stereo system, etc.) and allows the host device to display content. STB 118 may also be implemented as a home theater personal computer (HTPC), an optical disk player (e.g., digital video disk (DVD) or Blu-Ray™ disc player), a cable card, etc. STB 118 may receive commands and/or other type of data from other devices, such as remote control 124, and may transmit the data to other devices in environment 100.

Media device 120 may include a digital media player (e.g., Apple TV, Google Chromecast, Amazon Fire TV, etc.) configured to stream digital media files (e.g., video files, audio files, images, etc.) from personal computer 126, mobile device 130, ONT 112, DVR device 116, and/or another device via a wired connection or via a wireless connection (e.g., WiFi, etc.) with BHR 114. Media device 120 may include smart television features that enable media device 120 to support add-on applications. In some implementations, media device 120 may correspond to a High Definition Multimedia Interface (HDMI) dongle media device connected into a HDMI port of television 122. In some implementations, media device 120 may correspond to a gaming system (e.g., Microsoft XBOX, Sony Playstation, etc.).

Television 122 may output content received from STB 118 and/or from media device 120. Television 122 may include speakers as well as a display. In some implementations, television 122 may correspond to a smart television that supports add-on applications and/or is configured to communicate with other devices over an Internet Protocol (IP) connection and/or another type of network connection.

Remote control 124 may issue wired or wireless commands for controlling other electronic devices, such as television 122, media device 120, and/or STB 118. Remote control 124, in conjunction with television 122, media device 120, STB 118, and/or BHR 114, may allow a customer to interact with an application running on television 122, media device 120, STB 118, and/or BHR 114. Other types of devices (e.g., a keyboard, mouse, mobile phone, etc.) may be used instead of, or in addition to, remote control 124, in order to control television 122, media device 120, STB 118, and/or BHR 114.

Personal computer 126 may include a desktop computer, a laptop computer, a tablet computer, and/or another type of computation and/or communication device. Personal computer 126 may include a microphone to capture audio, a camera to capture images or video. Personal computer 126 may include display 128 for displaying images and/or video content received from BHR 114, STB 118, and/or media device 120. Personal computer 126 may also include a speaker for playing audio signals.

Mobile device 130 may include a portable communication device (e.g., a mobile phone, a smart phone, a phablet device, a global positioning system (GPS) device, and/or another type of wireless device); a laptop, tablet, a wearable computer (e.g., a wrist watch computer, etc.) and/or another type of portable computer; a media playing device; a portable gaming system; and/or any other type of mobile computer device with communication and output capabilities. Mobile device 130 may communicate with network 150 via base station 155. Furthermore, mobile device 130 may communicate with devices in customer premises 110 using a wireless connection via BHR 114 and/or directly using a short-range wireless method (e.g., Bluetooth, Near Field Communication (NFC), etc.). Mobile device 130 may consume content (e.g., play videos, etc.) received from video serving office 140 and/or stored by BHR 114 and/or DVR device 116.

Video serving office 140 may include one or more devices, such as computer devices and/or server devices, which ingest content, store content, format content, and/or deliver content to customer premises 110. For example, video serving office 140 may provide television channels and/or other type of content from a video content delivery system, such as VCMS 170. Furthermore, video serving office 140 may provide a connection service to network 150 for customer premises 110. For example, although FIG. 1 show VSO 140 directly connected to customer premises 110 via ONT 112, it should be understood that VSO 140 may also connect to customer premises 110 via network 150. VSO 140 may include a DVR scheduler 145.

DVR scheduler 145 may include one or more devices, such as computer devices and/or server devices, which schedule DVR recordings for DVR devices 116 located in different customer premises 110. For example, DVR scheduler 145 may maintain a list of unfulfilled recording requests received from the customer and may schedule update notification to be sent to DVR device 116 to instruct DVR device 116 to update a DVR recording list. DVR scheduler 145 may also instruct DVR device 116 to report a status of a recording request when an error is detected during recording. If DVR device 116 reports an error, DVR scheduler 145 may reschedule the recording.

Network 150 may include one or more circuit-switched networks and/or packet-switched networks. For example, network 150 may include a local area network (LAN), a wide area network (WAN), a metropolitan area network (MAN), a Public Switched Telephone Network (PSTN), an ad hoc network, an intranet, the Internet, a fiber optic-based network, a wireless network, and/or a combination of these or other types of networks. Network 150 may include base station 155. Base station 155 may function as a base station that enables wireless devices in customer premises 110, such as mobile device 130, to communicate with network 150. For example, base station 155 may include a Long Term Evolution eNodeB base station, a Global System for Mobile Communications (GSM) base station, a Code Division Multiple Access (CDMA) base station, and/or another type of base station.

Content provider 160 may include one or more devices, such as computer devices and/or server devices, which are configured to provide video content to VCMS 170. For example, content provider 160 may include free television broadcast providers (e.g., local broadcast providers, such as NBC, CBS, ABC, and/or Fox), for-pay television broadcast providers (e.g., TNT, ESPN, HBO, Cinemax, CNN, etc.), distributors of motion pictures, and/or Internet-based content providers (e.g., Youtube, Vimeo, Netflix, Hulu, Veoh, etc.) that stream content from web sites and/or permit content to be downloaded (e.g., via progressive download, etc.). Content provider 160 may include on-demand content providers (e.g., video on demand (VOD), pay per view (PPV), etc.).

VCMS 170 may include one or more server devices, or other types of computation or communication devices, that communicate with content providers 160 to ingest video content. VCMS 170 may process the video content to generate copies of the video content in one or more formats that are supported (e.g., that can be received, processed, and/or played) by the different types of user devices. VCMS 170 may publish the one or more formats, associated with the processed video content to a catalog associated with application server 180. VCMS 170 may provide processed video content to video serving office 140 for distribution to customer premises 110.

Application server 180 may include one or more server devices, or other types of computation or communication devices that receive metadata associated with video content processed by VCMS 170. Metadata may enable the video content to be identified, managed, offered, and/or distributed to a user device in customer premises 110. The metadata may include scheduled broadcast times for particular content and may provide the scheduled broadcast times to DVR scheduler 145.

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
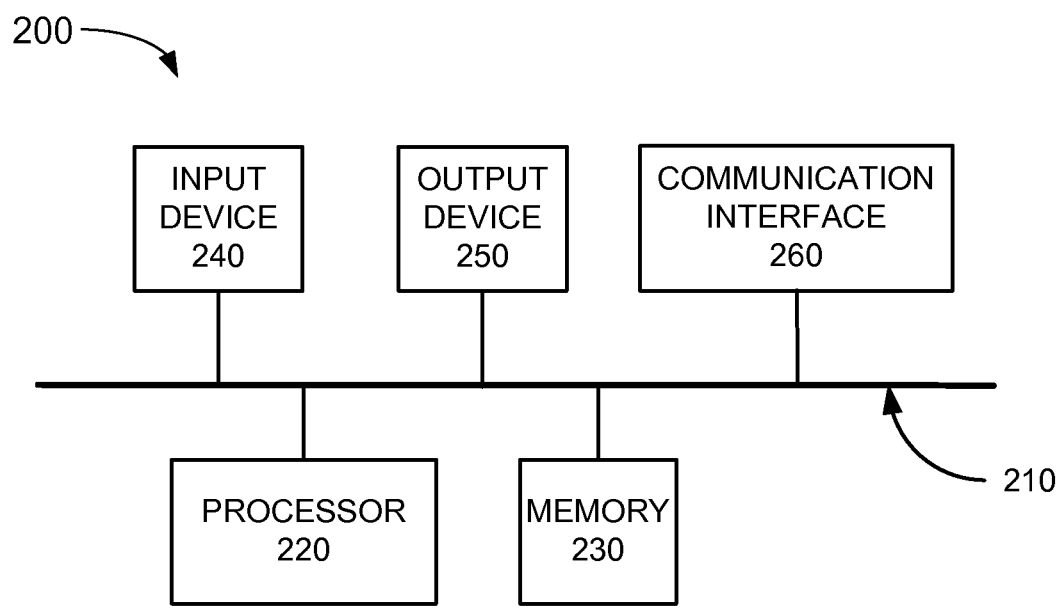
FIG. 2 is a diagram illustrating exemplary components of a computer device that may be included in one or more of the devices of FIG. 1.

FIG. 2 is a diagram illustrating exemplary functional components of device 200 according to an implementation described herein. BHR 114, DVR device 116, STB 118, media device 120, and/or DVR scheduler 145 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to a scheduling DVR recordings and/or synchronizing a recording list maintained locally by a DVR client with a recording list maintained by a centralized DVR system. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than those depicted in FIG. 2. Additionally or alternatively, one or more components of device 200 may perform one or more tasks described as being performed by one or more other components of device 200.

Figure 3:
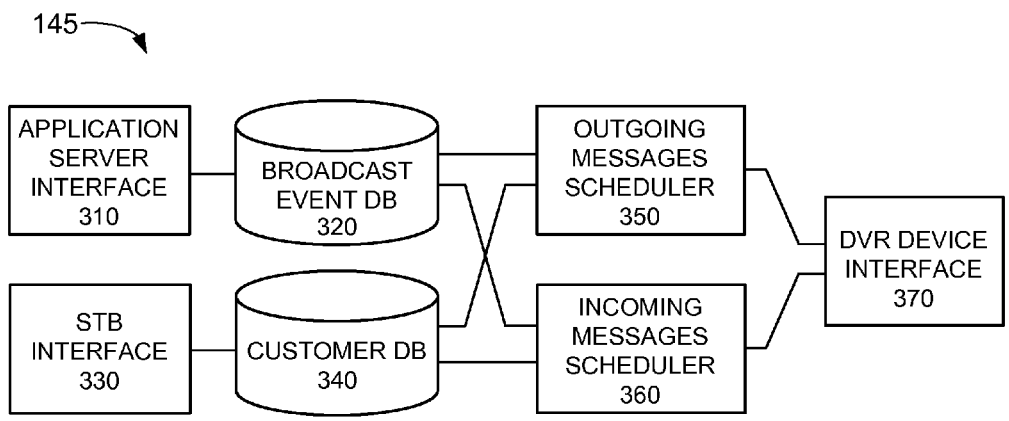
FIG. 3 is a diagram illustrating exemplary functional components of the digital video recorder (DVR) scheduler of FIG. 1.

FIG. 3 is a diagram illustrating exemplary functional components of DVR scheduler 145 according to an implementation described herein. The functional components of DVR scheduler 145 may be implemented, for example, via processor 220 executing instructions from memory 230. Alternatively, some or all of the functional components of DVR scheduler 145 may be implemented via hard-wired circuitry. As shown in FIG. 3, DVR scheduler 145 may include an application server interface 310, a broadcast event database (DB) 320, an STB interface 330, a customer DB 340, an outgoing messages scheduler 350, an incoming messages scheduler 360, and a DVR device interface 370.

Application server interface 310 may communicate with application server 180. For example, application server interface 310 may receive broadcast content metadata, such as scheduled broadcast times, from application server 180. Broadcast event DB 320 may store information relating to broadcast content. Exemplary information that may be stored in broadcast event DB 320 is described below with reference to FIG. 4.

STB interface 330 may communicate with STB 118. For example, STB interface 330 may receive recording requests from STB 118 (and/or media device 120) for broadcast content that the customer wishes to record using DVR device 116 and may store information relating to the received recording requests in customer DB 340. Exemplary information that may be stored in customer DB 340 is described below with reference to FIG. 5.

Outgoing messages scheduler 350 may manage outgoing messages to DVR device 116. For example, outgoing messages scheduler 350 may schedule recording instructions to be sent to particular DVR devices 116 based on recording requests received from customers associated with the particular DVR devices 116. Outgoing messages scheduler 350 may send out recording instructions based on the generated recording instructions schedules.

Incoming messages scheduler 360 may manage incoming messages from DVR device 116. As an example, incoming messages scheduler 360 may instruct DVR devices 116 to not send a status report relating to DVR recordings unless an error is detected in connection with a DVR recording. As another example, incoming messages scheduler 360 may generate an error reporting schedule for a particular broadcast content and may instruct DVR devices 116 that will be recording the particular broadcast content to send any detected errors associated with the recording according to the generated error reporting schedule.

DVR device interface 370 may communicate with DVR device 116. As an example, DVR device interface 370 may send a recording instruction from outgoing messages scheduler 350 to DVR device 116. As another example, DVR interface 370 may receive a status report, such as an error report associated with a recording, from DVR device 116, based on a reporting schedule generated by incoming messages scheduler 360.

Although FIG. 3 shows exemplary functional components of DVR scheduler 145, in other implementations, DVR scheduler 145 may include fewer functional components, different functional components, differently arranged functional components, or additional functional components than those depicted in FIG. 3. Additionally or alternatively, one or more functional components of DVR scheduler 145 may perform functions described as being performed by one or more other functional components of DVR scheduler 145.

Figure 4:
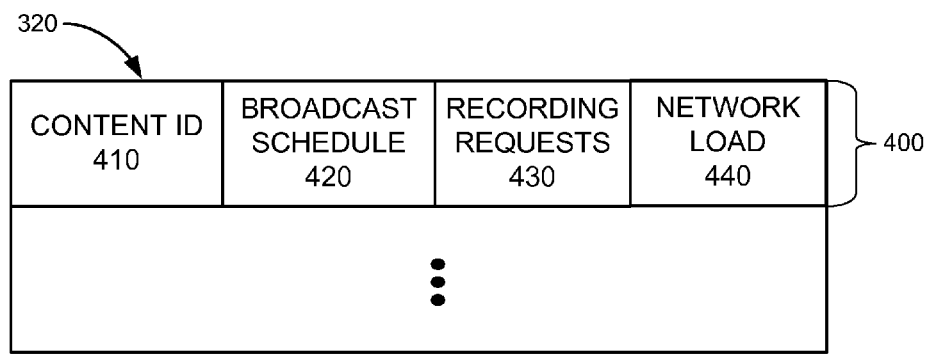
FIG. 4 is a diagram illustrating exemplary components that may be stored in the broadcast event database of FIG. 3.

FIG. 4 is a diagram illustrating exemplary information that may be stored in broadcast event DB 320. As shown in FIG. 4, broadcast event DB 320 may include one or more content records 400. Each content record 400 may store information relating to a particular broadcast content. Content record 610 may include a content identifier (ID) field 410, a broadcast schedule field 420, a recording requests field 430, and a network load field 440.

Content ID field 410 may store an identifier for a particular broadcast content. For example, content ID field 410 may identify a movie, a television show, a particular episode of a television show, a sports event broadcast, a news broadcast, and/or another type of broadcast content. Broadcast schedule field 420 may store information identifying times and dates when the particular broadcast content is scheduled to be broadcast. For example, a particular episode of a television show may be scheduled to be broadcast multiple times during a particular day, week, month, and/or a different type of time period. Additionally, as some broadcast content may be available on multiple television channels, broadcast schedule field 420 may identify a particular television channel for each time when the particular broadcast content is scheduled to be broadcast.

Recording requests field 430 may store information identifying recording requests received for the particular broadcast content. As an example, recording requests field 430 may identify the number of customers that have requested to record the particular content. As another example, recording requests field 430 may identify the particular customers that have requested to record the particular content. Additionally or alternatively, recording requests field 430 may store information identifying an estimated viewership for the particular broadcast content. As an example, the information may include an estimated number of customers that will view the broadcast content. As another example, the information may include a popularity score that estimates how popular the broadcast content is expected to be based. The popularity score may be estimated based on one or more parameters, such as the number of viewers for a previous broadcast of the broadcast content, a number of viewers for related broadcast content (e.g., a previous episode of a television show, etc.), a number of times the broadcast content is mentioned on social media and/or blog posts, the cost of an advertising spot associated for the broadcast content, and/or other types of parameters. The information stored in recording requests field 430 may be used to estimate a network load for a time period associated with a scheduled broadcast of the broadcast content, to schedule update notifications for DVR devices 116 to update the locally stored DVR recording lists, for scheduling error reporting for DVR devices 116, and/or for other purposes.

Network load field 440 may store information identifying an estimated network load during a time period that includes a scheduled broadcast for the broadcast content. The estimated network load may be based on one or more parameters, such as a historical network load for a particular time of day and/or a particular day of the week, network capacity for a particular geographic area, information stored in recording requests field 430, and/or other types of parameters. The information stored in network load field 440 may be used to schedule update notifications for DVR devices 116 to update the locally stored DVR recording lists, for scheduling error reporting for DVR devices 116, and/or for other purposes.

Although FIG. 4 shows exemplary fields of broadcast event DB 320, in other implementations, broadcast event DB 320 may include fewer fields, different fields, differently arranged fields, or additional fields than those depicted in FIG. 4.

Figure 5:
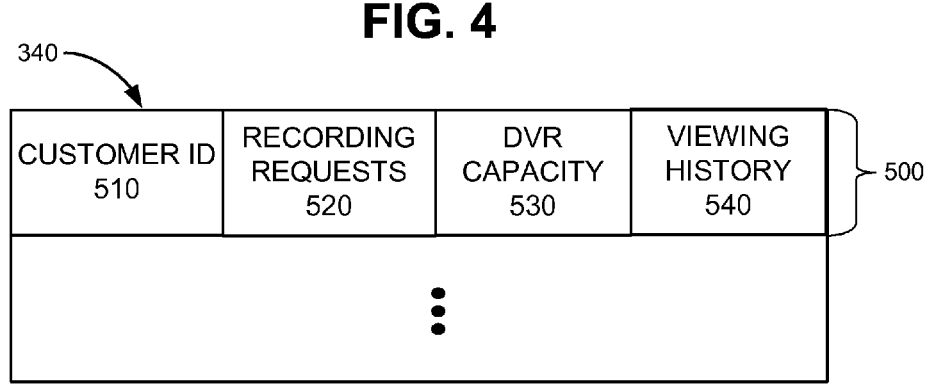
FIG. 5 is a diagram illustrating exemplary components that may be stored in the customer database of FIG. 3.

FIG. 5 is a diagram illustrating exemplary information that may be stored in customer DB 340. As shown in FIG. 5, customer DB 340 may include one or more customer records 500. Each customer record 500 may store information relating to a particular customer. Customer record 500 may include a customer ID field 510, a recording requests field 520, a DVR capacity field 530, and a viewing history field 540.

Customer ID field 510 may store information identifying a particular customer, such as an account number associated with the customer, an identifier associated with DVR device 116 associated with the customer, an identifier associated with STB 118 associated with the customer, the customer's contact information, and/or other type of identifying information associated with the customer.

Recording requests field 520 may store information identifying recording requests that have been received from the customer. Each recording request may identify particular broadcast content that the customer has requested to record using DVR device 116. Furthermore, each recording request may include information identifying whether the recording request has been fulfilled or unfulfilled. A recording request may include a recording ID that uniquely identifies the recording request, a content ID that identifies the broadcast content that is to be recorded, a start time to start the recording, an end time to end the recording, and a reporting flag to indicate whether a report should be sent after the recording. As an example, the reporting flag may instruct, for example, to report a storage capacity of DVR device 116 after the recording is completed. Additionally or alternatively, the reporting flag may instruct to only send a report of an error is detected during the recording.

DVR capacity field 530 may store information relating to the capacity of DVR device 116. For example, DVR capacity field 530 may store information relating to a current storage capacity of DVR device 116 and/or information relating to an estimated storage capacity over an upcoming time period. Storage capacity for an upcoming time period may be estimated based on, for example, unfulfilled recording requests associated with the customer and/or a viewing history associated with the customer. Additionally or alternatively, DVR capacity field 530 may store information relating to a number of enabled concurrent recording streams that DVR device 116 is configured to handle (e.g., an ability to record up to three different broadcast content streams at a time), a bandwidth capacity associated with a connection to customer premises 110, and/or other types of capacity information.

Viewing history field 540 may store information relating to the viewing history associated with the customer. As an example, viewing history field 540 may store information relating to times of day or days of week during which the customer or other residents of customer premises 110 do not watch television. As another example, viewing history field 540 may store information relating to times of day or days of week during which the customer or other residents of customer premises 110 watch content recorded by DVR device 116. As yet another example, viewing history field 540 may store information relating to times of day or days of week during which the customer or other residents of customer premises 110 watch episodes of a particular television show.

Although FIG. 5 shows exemplary fields of customer DB 340, in other implementations, customer DB 340 may include fewer fields, different fields, differently arranged fields, or additional fields than those depicted in FIG. 5.

Figure 6:
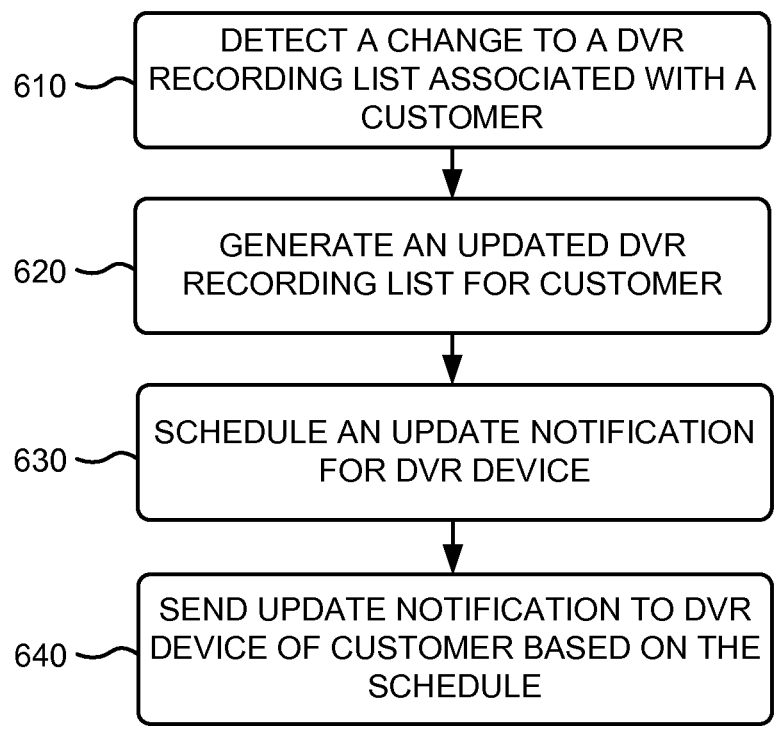
FIG. 6 is a flowchart for scheduling DVR instructions according to one or more implementations described herein.

FIG. 6 is a flowchart for scheduling DVR instructions according to one or more implementations described herein. In some implementations, the process of FIG. 6 may be performed by DVR scheduler 145. In other implementations, some or all of the process of FIG. 6 may be performed by another device or a group of devices separate from and/or including DVR scheduler 145.

The process of FIG. 6 may include detecting a change to a DVR recording list associated with a customer (block 610). As an example, a customer may use remote control 124 to browse a programming guide received by STB 118 from VSO 140 and displayed on TV 122. The customer may select an item included in the programming guide, such as a movie, a television show episode, a sporting event broadcast, and/or another type of broadcast content and may request to record the selected item using DVR device 116. In response, STB 118 may send the recording request to DVR scheduler 145.

As another example, DVR scheduler 145 may receive a metadata update from application server 180 indicating that a broadcast time for broadcast content included in the customer's DVR recording list has been changed. As yet another example, DVR scheduler 145 may add a particular broadcast content to the customer's DVR recording list based on the customer's preferences and/or recommendations. For example, the customer may be watching a TV show, a new episode of the TV show may be scheduled, and DVR scheduler 145 may add the new episode to the DVR recording list associated with the customer.

An updated DVR recording list may be generated for the customer (block 620) and an update notification may be scheduled for the DVR device associated with the customer (block 630). For example, outgoing messages scheduler 350 may store information relating to the detected DVR recording list change in customer record 500 of customer DB 340. Outgoing messages scheduler 350 may schedule an update notification by assigning a time at the update notification should be sent to DVR device 116. An exemplary process for scheduling an update notification is described below with reference to FIG. 7.

An update notification may be sent to the DVR device of the customer based on the schedule (block 640). For example, outgoing messages scheduler 350 may send the update notification to DVR device 116 according to the generated schedule. For example, when an assigned time or time range is detected, DVR scheduler 145 may send instructions to DVR devices 116 to request an updated DVR recording list or may send an updated DVR recording list to DVR device 116 with instructions to synchronize a locally stored DVR recording list with the updated DVR recording list.

Figure 7:
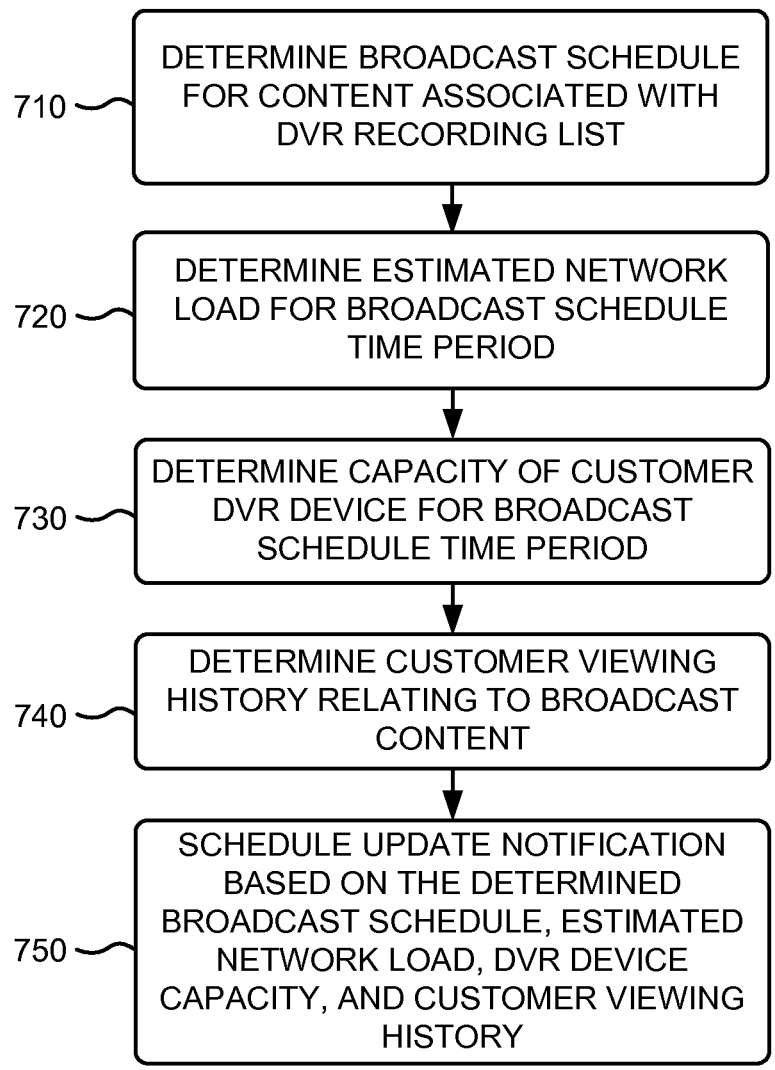
FIG. 7 is a flowchart for generating a recording instruction schedule according to one or more implementations described herein.

FIG. 7 is a flowchart for generating a recording instruction schedule according to one or more implementations described herein. In some implementations, the process of FIG. 7 may be performed by DVR scheduler 145. In other implementations, some or all of the process of FIG. 7 may be performed by another device or a group of devices separate from and/or including DVR scheduler 145.

The process of FIG. 7 may include determining the broadcast schedule for content associated with a DVR recording list (block 710). For example, application server interface 310 may receive information identifying scheduled broadcasting times for particular broadcast content from application server 180 and may store the information identifying scheduled broadcasting times in broadcast event DB 320.

An estimated network load may be determined for a broadcast schedule time period (block 720). For example, outgoing messages scheduler 350 may determine estimated network loads, in network 150 and/or network connections between VSO 140 and customer premises 110, for a time period from a current time to the time of the last determined scheduled broadcast for any broadcast content associated with an unfulfilled recording request associated with the customer. The estimated network load may be based on one or more parameters, such as a historical network load for a particular time of day and/or a particular day of the week, network capacity for a particular geographic area, information stored in recording requests field 430, and/or other types of parameters.

A capacity of a customer DVR device may be determined for the broadcast schedule time period (block 730). As an example, outgoing messages scheduler 350 may determine the capacity of DVR device 116, such as the estimated storage capacity over a time period from a current time to the time of the last determined scheduled broadcast for any broadcast content associated with an unfulfilled recording request associated with the customer. Information relating to the storage capacity of DVR device 116 may be obtained from DVR device 116 at periodic intervals by querying DVR device 116 during periods of low network traffic or retrieved from status reports received from DVR device 116. As another example, outgoing messages scheduler 350 may determine the estimated number of active recording streams being handled by DVR device 116 during the time period and compare the estimated number of recording streams with the total number of enabled recording streams for DVR device 116.

A customer viewing history relating to the broadcast content may be determined (block 740). As an example, outgoing messages scheduler 350 may determine the viewing history associated with the customer, such as times of day or days of week during which the customer or other residents of customer premises 110 do not watch television, times of day or days of week during which the customer or other residents of customer premises 110 watch content recorded by DVR device 116, times of day or days of week during which the customer or other residents of customer premises 110 watch episodes of a particular television show, and/or other types of viewing history information.

An update notification may be scheduled based on the determined broadcast schedule, based on the estimated network load, based on the determined DVR device capacity, and/or based on the determined customer viewing history (block 750). For example, outgoing messages scheduler 350 may use the obtained information to schedule an update notification to be sent to DVR device 116 associated with the customer. Outgoing messages scheduler 350 may schedule update notifications in a chronological order based on the broadcast schedule. For example, a first update notification that includes a first broadcast content may be sent earlier than a second update notification that includes second broadcast content if the first broadcast content is scheduled to be broadcast earlier than the second broadcast content. Furthermore, an update notification may be delayed until a particular time period prior to a scheduled broadcast time for broadcast content includes on the DVR recording list (e.g., an hour before the scheduled broadcast time).

In some implementations, determining how much an update notification may be delayed may be determined by segmenting a time period, during which content to be recorded is scheduled to be broadcast, into time segments and generating a hash for each time segment. For example, a hash code for every 8 hours may be generated to determine how far a change to a DVR recording list is in time from the current time by comparing the hash code of the DVR recording list associated with the last update notification with a hash code of the currently updated DVR recording list. If the change occurs outside the desired duration (e.g., a particular length of time away from the current time), the update notification may be delayed until a later comparison is made.

Moreover, outgoing messages scheduler 350 may distribute update notifications for a particular broadcast content, which need to be sent to a large number of DVR devices, over a time period. Thus, if the DVR recording lists of a large number of customers include the particular broadcast content (e.g., greater that a threshold), DVR scheduler 145 may distribute the update notifications for the customers over a time period that precedes the broadcast time of the particular broadcast content. For example, DVR scheduler 145 may divide the time period before the upcoming scheduled broadcast time into time segments and may assign different subsets of the customers to different time segments. Each subset of the customers may then receive the update notification within the assigned time segment, thereby reducing the load on the network connections to DVR devices 116 during the time period.

Furthermore, the scheduled update notifications may be re-arranged based on other parameters. For example, a scheduled update notification may be delayed or scheduled earlier in order to avoid a time period with a high estimated network load (e.g., time periods with an estimated network load higher than a network load threshold).

Furthermore, a scheduled update notification may be delayed or scheduled earlier based on the determined capacity of DVR device 116. For example, if DVR device 116 is estimated to not have enough storage capacity to record a particular broadcast content, but is estimated to have an increased storage capacity at a later time, and the broadcast content has multiple scheduled broadcast times, the scheduled update notification may be delayed until a particular time period before the later scheduled broadcast time.

Furthermore, a scheduled update notification may be delayed or scheduled earlier based on the viewing history associated with the customer. For example, if a particular broadcast content has multiple scheduled broadcast times, and the viewing history associated with the customer indicates that there is a high likelihood that the customer will not view the recorded content until after a later scheduled broadcast time, the scheduled update notification may be delayed until a particular time period before the later scheduled broadcast time.

Figure 8:
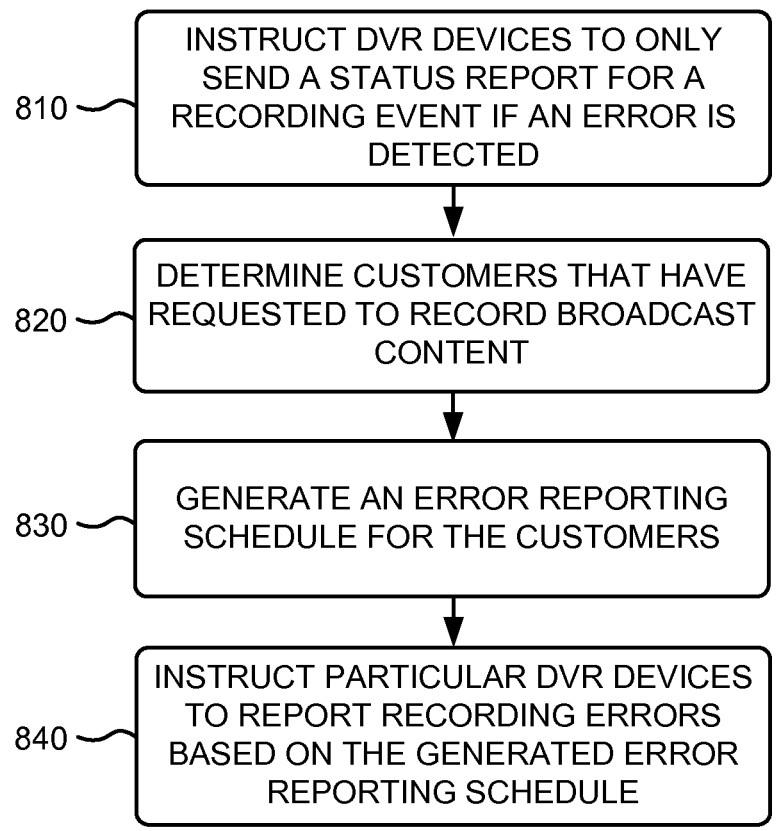
FIG. 8 is a flowchart for generating an error reporting instruction schedule according to one or more implementations described herein.

FIG. 8 is a flowchart for generating an error reporting instruction schedule according to one or more implementations described herein. In some implementations, the process of FIG. 8 may be performed by DVR scheduler 145. In other implementations, some or all of the process of FIG. 8 may be performed by another device or a group of devices separate from and/or including DVR scheduler 145.

The process of FIG. 8 may include instructing DVR devices to only send a status report for a recording event if an error is detected (block 810). For example, DVR devices 116 may be configured to send a status report for each DVR recording event. Thus, DVR device 116 may be configured to report that a particular broadcast content has been successfully recorded. Since most recording events are recorded successfully, DVR scheduler 145 may assume or determined that a recording event has been successfully performed unless an error report is received from DVR device 116. Thus, in order to reduce network load, DVR scheduler 145 may instruct DVR devices 116 to only send status reports for recording events if an error has been detected.

Furthermore, for some broadcast content, such as broadcast content with a number of unfulfilled recording requests that is higher than a recording requests number threshold, broadcast content with an estimated viewership higher than a viewership number threshold, and/or broadcast content with a popularity score higher than a popularity threshold, incoming messages scheduler 360 may distribute error reporting over a period of time in order to further reduce the load on the network.

Customers that have requested to record a broadcast content may be determined (block 820) and an error reporting schedule may be determined for the determined customers (block 830). For example, incoming messages scheduler 360 may identify customer that have requested the broadcast content based on unfulfilled recording requests stored in customer records 500 and may determine a time period after the broadcast content is scheduled to be broadcast. Incoming messages scheduler 360 may divide the time period into segments, may divide the identified customers into groups, and may assign each customer group to a different segment.

Particular DVR devices may be instructed to report recording errors based on the generated reporting schedule (block 840). For example, incoming messages scheduler 360 may instruct a first group of DVR devices 116 to send any error reports during a first assigned time period segment, may instruct a second group of DVR devices 116 to send any error reports during a second assigned time period segment, etc. Thus, any error reports for the broadcast content sent by DVR devices 116 to DVR scheduler 145 may be spread out over a time period rather than all being sent within a relative short time after a scheduled broadcast time.

Figure 9:
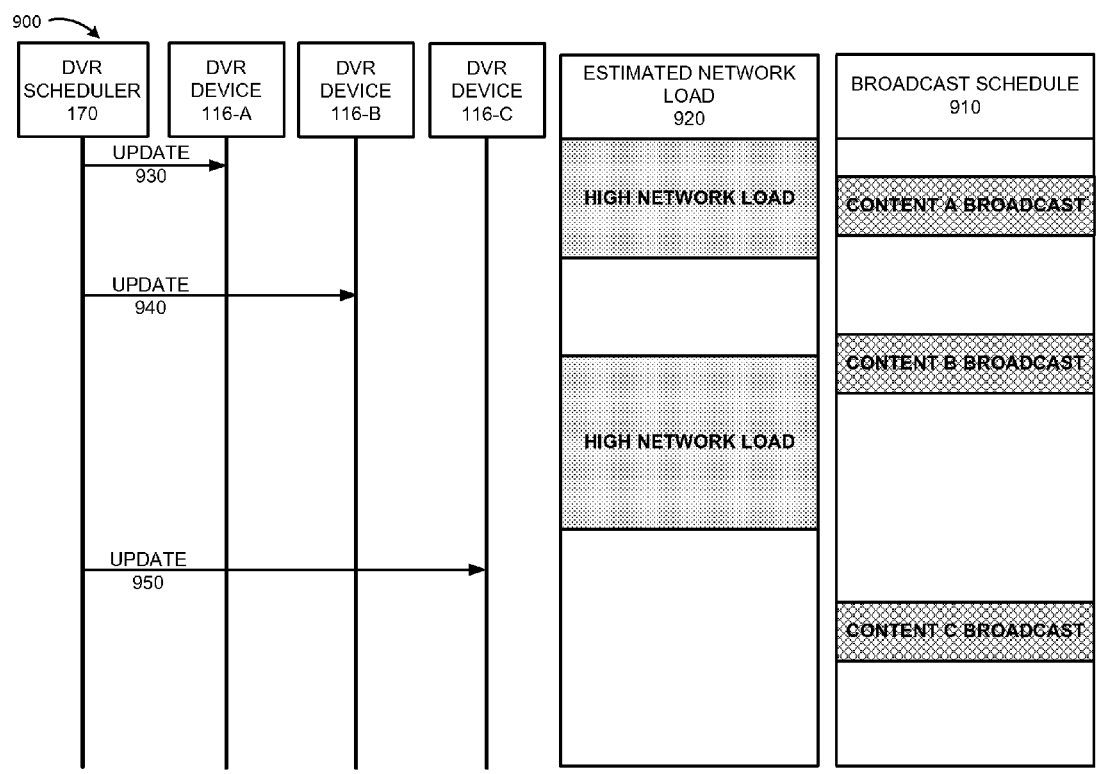
FIG. 9 is a first exemplary signal flow diagram according to an implementation described herein.

FIG. 9 is a first exemplary signal flow diagram 900 according to an implementation described herein. Signal flow diagram 900 illustrates how broadcast content schedule information and estimated network load information may be used to schedule recording instructions to be sent to DVR device 116. Assume a first customer is associated with DVR device 116-A, a second customer is associated with DVR device 116-B, and a third customer is associated with DVR device 116-C. Further, assume that within a short time period, the first customer has requested to record content A, the second customer has requested content B, and the third customer has requested content C. FIG. 9 illustrates the broadcast schedule 910 for content A, content B, and content C and the estimated network load 920 during the same time period.

DVR scheduler 145 may determine that an update notification to update a DVR recording list to include content A should be sent immediately to DVR device 116-A, in order for DVR device 116-A to receive the update notification in time to record content A. Furthermore, DVR scheduler 145 may schedule to delay update notifications to DVR device 116-B and to DVR 116-C based on broadcast schedule 910 and based on the estimated network load 920.

DVR scheduler 145 may determine that a time period of lower network load will be available before the broadcast time of content B and may send update notification 940 to DVR device 116-B update a DVR recording list to include content B after an estimated end to a period of high network load and before the broadcast time of content B. Furthermore, DVR scheduler 145 may determine that a time period of lower network load will be available before the broadcast time of content C and may send update notification 950 to DVR device 116-C update a DVR recording list to include content C after an estimated end to a period of high network load and before the broadcast time of content C.

Figure 10:
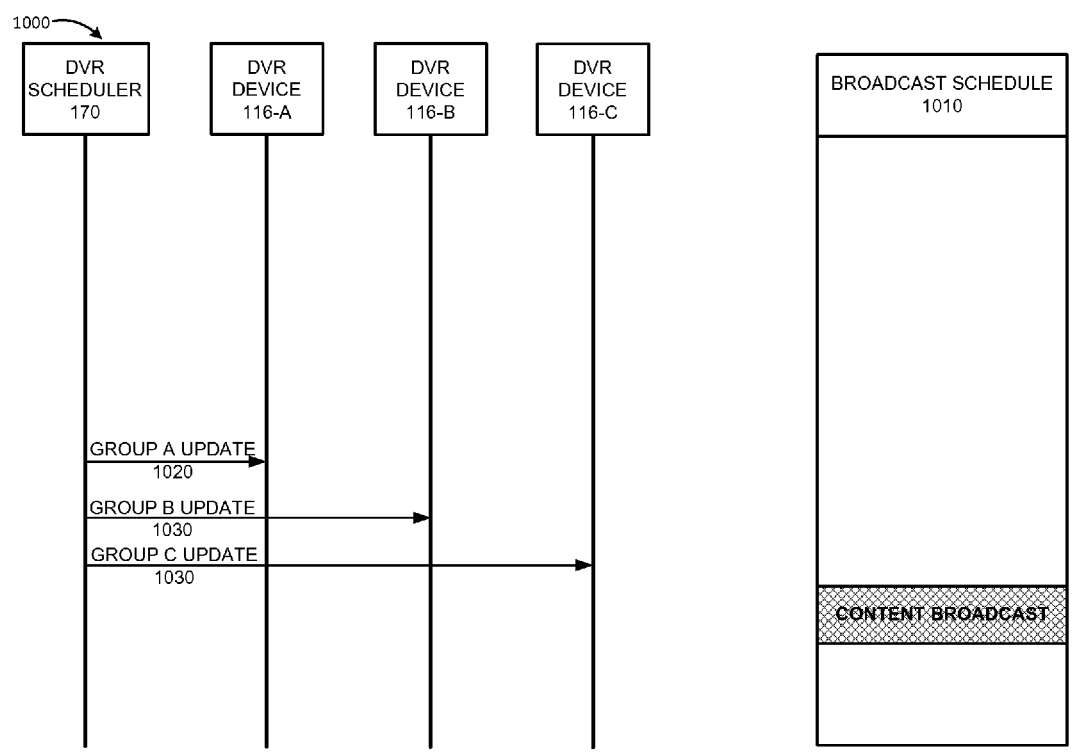
FIG. 10 is a second exemplary signal flow diagram according to an implementation described herein.

FIG. 10 is a second exemplary signal flow diagram 1000 according to an implementation described herein. Signal flow diagram 1000 illustrates how update notifications for a particular broadcast content may be distributed over a time period. Assume that content D is very popular and has been requested to be recorded by a large number of customers (e.g., larger than a recording request threshold). Assume, for illustrative purposes, that DVR scheduler 145 has selected to distribute update notifications for content D into three groups over a time period before the broadcast time for content D as shown in broadcast schedule 1010. DVR scheduler 145 may assign DVR device 116-A to a first group of customers, may assign DVR device 116-B to a second group of customer, and may assign DVR device 116-C to a third group of customers. DVR scheduler 145 may schedule update notifications for the first group first and a group A update 1020 may be sent to the DVR devices 116 in the first group, which includes DVR device 116-A. DVR scheduler 145 may then schedule update notifications for the second group next and a group B update 1030 may be sent to the DVR devices 116 in the second group, which includes DVR device 116-B. DVR scheduler 145 may then schedule update notifications for the third group and a group C update 1040 may be sent to the DVR devices 116 in the third group, which includes DVR device 116-C.

Figure 11:
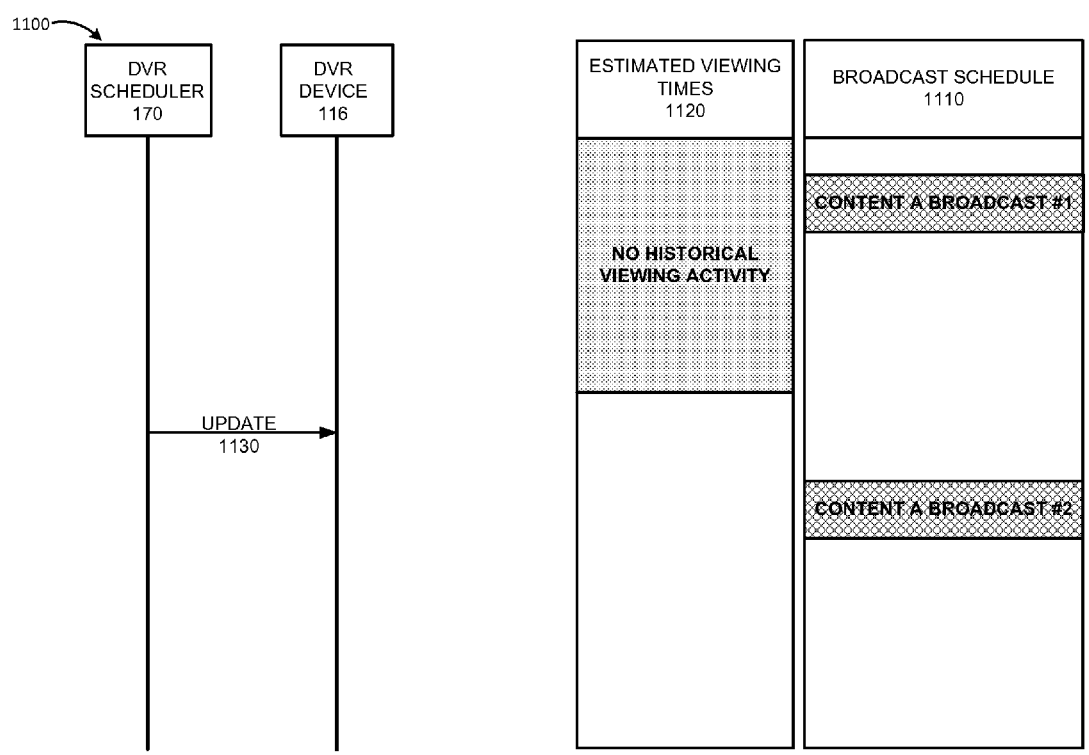
FIG. 11 is a third exemplary signal flow diagram according to an implementation described herein.

FIG. 11 is a third exemplary signal flow diagram 1100 according to an implementation described herein. Signal flow diagram 1100 illustrates how broadcast content schedule information and estimated viewing times may be used to schedule recording instructions to be sent to DVR device 116. Assume a customer associated with DVR device 116 has requested to record content E broadcast. As shown in broadcast schedule 1110, content E may have a first broadcast time and a second broadcast time at a later time. DVR scheduler 145 may obtain the viewing history 1120 for the customer and may determine that the customer does not have any historical viewing events in a time period including the first content E broadcast time and including a time period after the first content E broadcast time and before the second content E broadcast time. Thus, DVR scheduler 145 may schedule an update notification 1130 to be sent to DVR device 116 after the period of no historical viewing activity ends and before the second scheduler broadcast time for content E.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

As an example, while a series of blocks have been described with respect to FIGS. 6-8, and a series of signal flows have been described with respect to FIGS. 9-11, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method, performed by a computer device, the method comprising:
   detecting, by the computer device, a change in a digital video recorder (DVR) recording list associated with a customer;
   generating, by the computer device, an updated DVR recording list based on the detected change;
   generating, by the computer device, a schedule for an update notification for the DVR recording list to a DVR device associated with the customer based on a broadcast schedule for a broadcast content associated with the updated DVR recording list;

determining, by the computer device, that the broadcast content is available at a later broadcast time from a previously scheduled broadcast time;

delaying, by the computer device, the update notification for the DVR recording list to the DVR device based on determining that the broadcast content is available at a later broadcast time; and sending, by the computer device via a network connection between a video serving office and a customer premises, the delayed update notification for the DVR recording list to the DVR device associated with the customer based on the generated schedule.

2. The method of claim 1, further comprising:

determining that the customer is one of a number of customers that have requested to record the broadcast content, wherein the number is greater than a threshold;

generating an update notification schedule for the customers, wherein a particular subset of the customers is assigned to a particular segment of a time period, and wherein the particular subset includes the customer; and and wherein generating the schedule for the update notification for the DVR device associated with the customer includes:

scheduling the update notification to be sent within the particular segment of the time period.

3. The method of claim 1, wherein generating the schedule for the update notification is further based on an estimated network load for a connection between the computer device and the DVR device during an upcoming time period.

4. The method of claim 3, further comprising:

determining that the broadcast content, associated with the updated DVR recording list, has a scheduled broadcast time that is later than a first time period with a first estimated network load that is higher than a second estimated network load during a second time period, wherein the second time period is between the first time period and the scheduled broadcast time; and scheduling the update notification to the DVR device to be sent during the second time period.

5. The method of claim 4, wherein the first time period includes at least one of:

a particular time of day associated with a higher broadcast content viewing rate than a broadcast content viewing rate associated with the second time period;

a time period associated with a number of recording requests that is higher than a recording request threshold; or a time period associated with a scheduled broadcast content with an estimated viewership number that is higher than a viewership threshold.

6. The method of claim 1, wherein generating the schedule for the update notification is further based on a capacity of the DVR device.

7. The method of claim 6, further comprising:

determining that the broadcast content, associated with the updated DVR recording list, has a scheduled broadcast time that is later than a first time period with a first DVR device capacity that is lower than a second DVR device capacity during a second time period, wherein the second time period is between the first time period and the scheduled broadcast time; and scheduling the update notification to the DVR device to be sent during the second time period.

8. The method of claim 1, wherein generating the schedule for the update notification is further based on a viewing history associated with the customer.

9. The method of claim 8, further comprising:

determining that the broadcast content, associated with the updated DVR recording list, has a first scheduled broadcast time and a second scheduled broadcast time that is later than the first scheduled broadcast time;

determining, based on the viewing history associated with the customer, that the customer is estimated to watch the broadcast content after the second scheduled broadcast time; and scheduling the update notification to the DVR device to be sent during a time period between the first schedule broadcast time and the second scheduled broadcast time.

10. The method of claim 1, further comprising:

instructing the DVR device to not send a status report for the broadcast content associated with the updated DVR recording list unless an error is detected during a recording of the broadcast content.

11. The method of claim 10, further comprising:

determining that a plurality of customers have requested to record the broadcast content;

generating an error reporting schedule for the plurality of customers, wherein a particular subset of the plurality of customers is assigned to a particular segment of a time period; and instructing DVR devices associated with the particular subset of the plurality of customers to report any errors associated with recording of the broadcast content during the particular segment of the time period.

12. The method of claim 10, further comprising:

determining that the broadcast content is associated with a number of recording requests that is higher than a recording request threshold; and instructing the DVR device to delay sending any error messages detected during the recording of the broadcast content until a particular time period has elapsed.

13. A computer device comprising:

logic configured to:

detect a change in a digital video recorder (DVR) recording list associated with a customer;

generate an updated DVR recording list based on the detected change;

generate a schedule for an update notification for the DVR recording list to a DVR device associated with the customer based on a broadcast schedule for a broadcast content associated with the updated DVR recording list;

determine that the broadcast content is available at a later broadcast time from a previously scheduled broadcast time;

delay the update notification for the DVR recording list to the DVR device based on determining that the broadcast content is available at a later broadcast time; and send, via a network connection between a video serving office and a customer premises, the delayed update notification for the DVR recording list to the DVR device associated with the customer based on the generated schedule.

14. The computer device of claim 13, wherein the logic is further configured to:

determine that the broadcast content, associated with the updated DVR recording list, has a scheduled broadcast time that is later than a first time period with a first estimated network load that is higher than a second estimated network load during a second time period, wherein the second time period is between the first time period and the scheduled broadcast time; and schedule the update notification to the DVR device to be sent during the second time period.

15. The computer device of claim 13, wherein the logic is further configured to:

determine that the broadcast content, associated with the updated DVR recording list, has a scheduled broadcast time that is later than a first time period with a first DVR device capacity that is lower than a second DVR device capacity during a second time period, wherein the second time period is between the first time period and the scheduled broadcast time; and schedule the update notification to the DVR device to be sent during the second time period.

16. The computer device of claim 13, wherein the logic is further configured to:

instruct the DVR device to not send a status report for the broadcast content associated with the updated DVR recording list unless an error is detected during a recording of the broadcast content.

17. A non-transitory computer-readable memory device storing instructions executable by a processor, the non-transitory computer-readable memory device comprising:

one or more instructions to detect a change in a digital video recorder (DVR) recording list associated with a customer;

one or more instructions to generate an updated DVR recording list based on the detected change;

one or more instructions to generate a schedule for an update notification for the DVR recording list to a DVR device associated with the customer based on at least one of a broadcast schedule for broadcast content associated with the updated DVR recording list, an estimated network load for a connection between the computer device and the DVR device during an upcoming time period, a capacity of the DVR device, or a viewing history associated with the customer;

one or more instructions to determine that the broadcast content is available at a later broadcast time from a previously scheduled broadcast time;

one or more instructions to delay the update notification for the DVR recording list to the DVR device based on determining that the broadcast content is available at a later broadcast time;

one or more instructions to send, via a network connection between a video serving office and a customer premises, the delayed update notification to the DVR device associated with the customer based on the generated schedule; and one or more instructions to instruct the DVR device to not send a status report for the broadcast content unless an error is detected during a recording of the broadcast content.

18. The non-transitory computer-readable memory device of claim 17, further comprising:

one or more instructions to determine that the broadcast content, associated with the updated DVR recording list, has a scheduled broadcast time that is later than a first time period with a first estimated network load that is higher than a second estimated network load during a second time period, wherein the second time period is between the first time period and the scheduled broadcast time; and one or more instructions to schedule the update notification to the DVR device to be sent during the second time period.

19. The non-transitory computer-readable memory device of claim 17, further comprising:

one or more instructions to determine that the broadcast content, associated with the updated DVR recording list, has a scheduled broadcast time that is later than a first time period with a first DVR device capacity that is lower than a second DVR device capacity during a second time period, wherein the second time period is between the first time period and the scheduled broadcast time; and one or more instructions to schedule the update notification to the DVR device to be sent during the second time period.

* * * * *